(12) United States Patent
Zomchek et al.

(10) Patent No.: US 9,244,153 B2
(45) Date of Patent: Jan. 26, 2016

(54) RADIO FREQUENCY IDENTIFICATION IN SAFETY APPLICATIONS

(71) Applicant: Rockwell Automation Technologies, Inc., Mayfield Heights, OH (US)

(72) Inventors: Kevin M. Zomchek, Nashua, NH (US); Derek W. Jones, Kirkcudbright (GB); William E. Waltz, Mentor, OH (US); Richard W. Boyd, Holliston, MA (US); Wayne Foster, Tyngsborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 330 days.

(21) Appl. No.: 13/664,631

(22) Filed: Oct. 31, 2012

(65) Prior Publication Data

US 2014/0118117 A1    May 1, 2014

(51) Int. Cl.
| | |
|---|---|
| *G01S 1/68* | (2006.01) |
| *G01S 5/14* | (2006.01) |
| *G01S 13/87* | (2006.01) |
| *G06K 17/00* | (2006.01) |
| *G01S 13/75* | (2006.01) |
| *G05D 1/02* | (2006.01) |
| *G01S 5/02* | (2010.01) |

(52) U.S. Cl.
CPC ............. *G01S 5/14* (2013.01); *G01S 13/876* (2013.01); *G06K 17/00* (2013.01); *G01S 1/68* (2013.01); *G01S 5/0289* (2013.01); *G01S 13/751* (2013.01); *G05D 1/0274* (2013.01)

(58) Field of Classification Search
CPC ..... G01S 13/876; G01S 13/751; G01S 5/0289
USPC ......................................... 340/8.1; 701/23, 26
See application file for complete search history.

(56) References Cited

U.S. PATENT DOCUMENTS

| 8,159,329 B1 * | 4/2012 | Killian et al. ............. 340/8.1 |
|---|---|---|
| 2006/0071790 A1 * | 4/2006 | Duron et al. ............. 340/572.1 |

(Continued)

FOREIGN PATENT DOCUMENTS

| EP | 2341361 A1 | 6/2011 |
|---|---|---|
| GB | 2466189 A | 6/2010 |

OTHER PUBLICATIONS

"Industrial RFID for Automated Guided Vehicles".

(Continued)

*Primary Examiner* — Steven Lim
*Assistant Examiner* — Benyam Haile
(74) *Attorney, Agent, or Firm* — Boyle Fredrickson, S.C.

(57) ABSTRACT

Aspects of the present invention provide an RFID system for safely controlling an auto guided vehicle, an automated robot or other moving object ("AGV"). The system may include a plurality of radio frequency identification ("RFID") tags, and each may store a unique identification in a first memory location, a position in a second memory location and/or an instruction in a third memory location. An AGV having an RFID transceiver or antenna and a computer with a non-transitory computer-readable storage medium containing a predetermined table may read one or more of the memory locations. The table comprises a plurality of data elements with certain data elements associated with particular RFID tags. The AGV safely determines its location upon matching the one or more memory locations read with one or more data elements, or triggers a fault upon failing to match. The AGV may also predict the next RFID tag.

16 Claims, 8 Drawing Sheets

(56) References Cited

U.S. PATENT DOCUMENTS

2008/0197194 A1* 8/2008 Flood .......................... 235/385
2011/0043373 A1 2/2011 Best et al.
2011/0095865 A1* 4/2011 Harasti et al. ................ 340/10.1

OTHER PUBLICATIONS

"Easy, secure and reliable absolute position determination of AGVs in industrial environments using RFID".
EP 13191115.8, Search Report dated Feb. 24, 2014, 6 pgs.

* cited by examiner

RADIO FREQUENCY IDENTIFICATION IN SAFETY APPLICATIONS

BACKGROUND OF THE INVENTION

The present invention relates to radio frequency identification ("RFID") in safety applications, and in particular, to an RFID system for safely controlling an auto guided vehicle, an automated robot or other moving object ("AGV").

RFID tags are typically used to detect the presence or identity of a physical object wherein an RFID tag is attached to the physical object. RFID tags may also be used to determine the location of a moving object in an RFID system wherein an RFID tag is attached to a stationary object at a particular location and detection of the RFID tag via an RFID transceiver on the moving object indicates proximity of the moving object to the stationary object at the particular location.

RFID tags are typically small, passive devices in which, upon coming into proximity of an electromagnetic field produced by an RFID transceiver or antenna, the RFID tag energizes and transmits via radio frequency waves data held in the RFID tag's memory. RFID tags often contain an unalterable, unique identification number at a particular memory location that is programmed during manufacturing, and a plurality of alterable memory locations for subsequent applications. Each memory location in the RFID tag may be read when energized by the RFID transceiver or antenna, and each alterable memory location in the RFID tag may be written and/or rewritten by the RFID transceiver or antenna until it is made unalterable by the RFID transceiver or antenna, or locked.

AGV's are typically used in field, warehouse, factory and industrial environments to accomplish certain tasks, such as moving objects from one location to another. AGV's may be guided by an electrical wire or track in the field, warehouse, factory or industrial environment or may be free running. To monitor if people are nearby and to avoid collisions, AGV's may utilize laser scanners which can detect, for example, people and objects in a 190° field around the AGV up to several meters away. In addition, the field, warehouse, factory or industrial environment may use safety edges in which the AGV stops if coming into contact. These methods offer some protection for people, but do not provide location based information.

SUMMARY OF THE INVENTION

The present inventors have recognized that an RFID system may be used for safely controlling AGV's, such as in a field, warehouse, factory or industrial environment. As described herein, an AGV may utilize locally stored information about the RFID system in conjunction with an RFID transceiver or antenna for detecting radio frequency identification tags in proximity and allowing safe movement between locations. If personnel are identified via other technology with the area, the safety control system may stop the AGV or all AGV's in the area. As such, a Safety Integrity Level 2 ("SIL 2") or Performance Level d ("PLd") characteristic may be achieved, such as in accordance with IEC/EN 62061, "Safety of machinery: Functional safety of electrical, electronic and programmable electronic control systems," and EN ISO 13849-1:2008, each describing safety-related electrical control systems and which documents are hereby expressly incorporated by reference, by minimizing collisions and thus potential injury and damage.

Aspects of the present invention provide a moving object with a processor executing a program stored in a non-transitory computer-readable storage medium and having a radio frequency identification transceiver or antenna for communicating with a plurality of radio frequency identification tags, wherein the program instructs the processor to perform the following steps: (a) read a first memory location from a radio frequency identification tag in proximity, the first memory location storing a unique identification; (b) compare the first memory location with a plurality of first data elements stored in a predetermined table, each of the first data elements associated with a particular radio frequency identification tag; (c) safely determine a current position of the moving object upon successfully matching the first memory location with a first data element; and (d) trigger a fault upon failing to match the first memory location with a first data element.

The moving object may further comprise predicting a first memory location for the next radio frequency identification tag in proximity to be read. The moving object may trigger a fault if the first memory location read from the next radio frequency identification tag in proximity fails to match the prediction.

The moving object may slow down and/or stop upon triggering a fault.

The moving object may further comprise reading a second memory location from the radio frequency identification tag in proximity, the second memory location storing a position, comparing the first and second memory locations with a plurality of first and second data elements stored in the predetermined table, safely determining a current position of the moving object upon successfully matching the first and second memory locations with a first and second data element, and triggering a fault upon failing to match the first and second memory locations with a first and second data element. The first and second memory locations may each be alterable and may each be subsequently made unalterable.

The moving object may further comprise reading a second memory location from the radio frequency identification tag in proximity, the second memory location storing an instruction for the moving object. The instruction may be stored, for example, in an alterable memory location and may subsequently be made unalterable. The instruction may command the moving object to change direction or stop, for example. The unalterable identification, the instruction and the alterable position may also each be read from different memory locations.

The plurality of radio frequency identification tags may be arranged in a grid, in a pathway(s), or in a hybrid arrangement.

Another embodiment may similarly provide a method for safely controlling a moving object using radio frequency identification comprising: (a) reading a first memory location from a radio frequency identification tag in proximity, the first memory location storing a unique identification; (b) comparing the first memory location with a plurality of first data elements stored in a predetermined table, each of the first data elements associated with a particular radio frequency identification tag; (c) safely determining a current position of the moving object upon successfully matching the first memory location with a first data element; and (d) triggering a fault upon failing to match the first memory location with a first data element.

Yet another embodiment may similarly provide radio frequency identification system for safely controlling a moving object comprising: a plurality of radio frequency identification tags, each storing a unique identification in a first memory location; and a moving object having a radio frequency identification transceiver or antenna for communicating with each of the plurality of radio frequency identification tags and a processor with a non-transitory computer-readable storage medium containing a predetermined table comprising a plurality of first data elements, each of the first data elements associated with a particular radio frequency identification tag. The moving object may read a first memory location from a radio frequency identification tag in proximity, safely determine a current position upon successfully matching the first memory location with a first data element, and trigger a fault upon failing to match the first memory location with a first data element.

These and other objects, advantages and aspects of the invention will become apparent from the following description. The particular objects and advantages described herein may apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

DETAILED DESCRIPTION OF THE PREFERRED EMBODIMENT

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Figure 1:
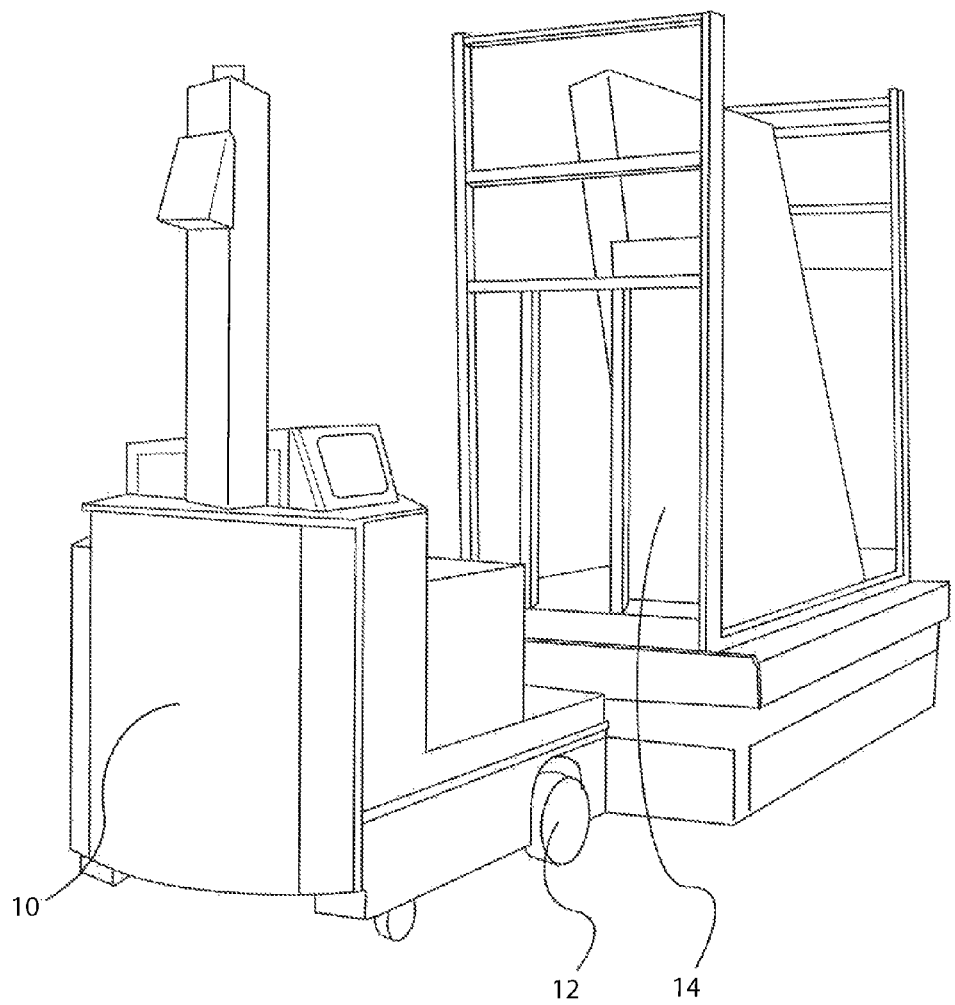
FIG. 1 is an isometric drawing of an auto guided vehicle carrying a payload in accordance with an embodiment of the present invention.

Referring now to the drawings wherein like reference numbers correspond to similar components throughout the several views and, specifically, referring to FIG. 1, the present invention shall be described in the context of an auto guided vehicle ("AGV") 10 carrying a payload in a field, warehouse, factory or industrial environment. The AGV 10 may include, for example, a battery operated engine (not shown) and wheels 12 for transporting a work piece or payload 14 between locations in the warehouse, including between floors in a building. In an alternative embodiment, the AGV may be any other moving object, such as an automated robot, or a crane, for example.

Figure 2:
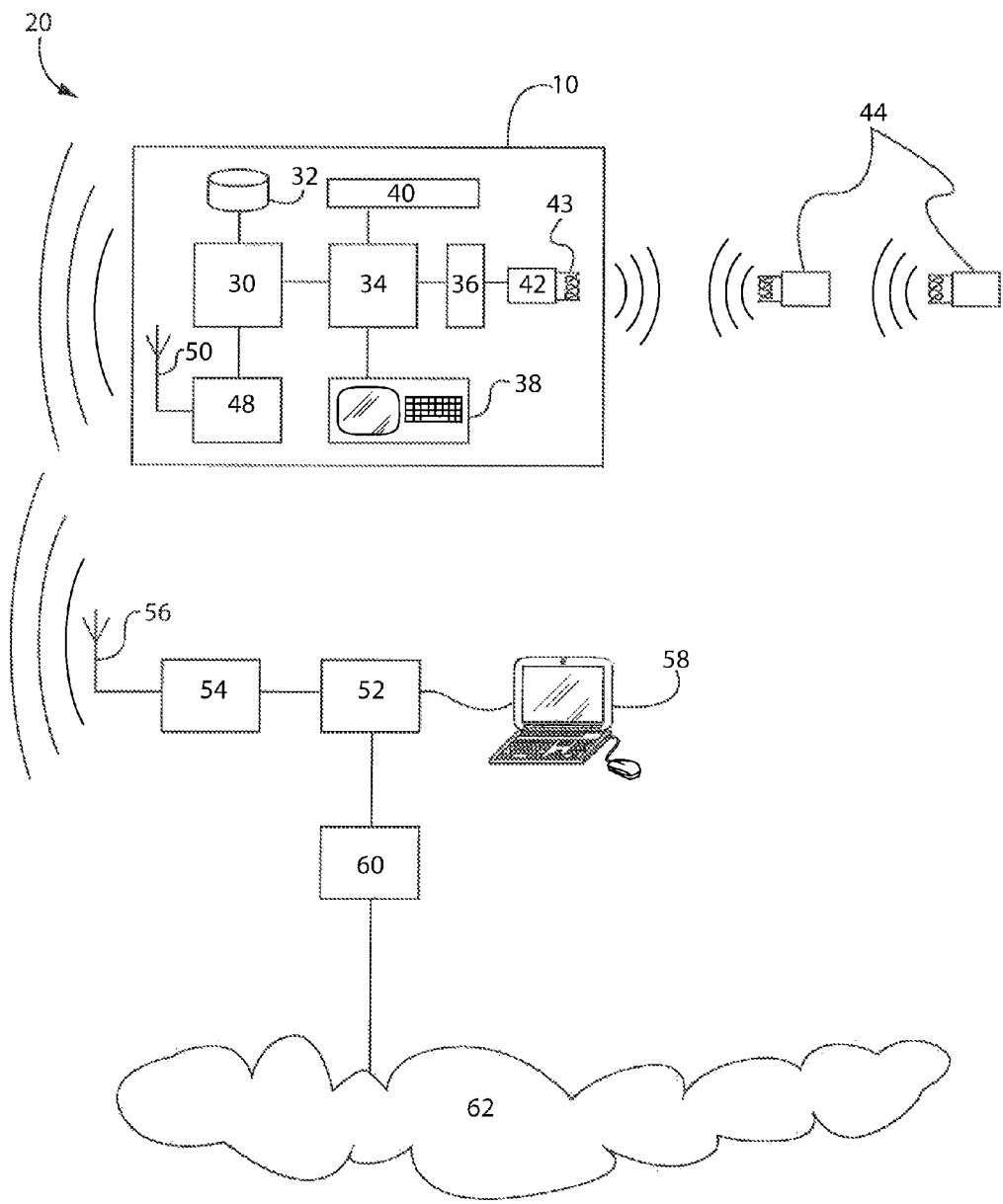
FIG. 2 is an architectural diagram of a radio frequency identification system for safely controlling an auto guided vehicle, an automated robot, or other moving object or machine in accordance with an embodiment of the present invention.

Referring now to FIG. 2, an architectural diagram of a radio frequency identification system 20 for safely controlling the AGV 10 in accordance with an embodiment of the present invention is shown. The AGV 10 comprises a computer or programmable logic controller ("PLC") 30 which may be, for example, a ControlLogix™ 1756 as available from Rockwell Automation, Inc. The PLC 30 includes one or more processors and memory and is coupled to additional non-transitory computer-readable storage medium 32 which may be, for example, a hard disk drive, floppy disk, optical disc, magnetic tape, flash memory, etc., for holding a computer program and data. The PLC 30 may also coupled to a switch 34, which in turn, is separately coupled to a network interface 36, an input/output ("I/O") user interface 38 having a keyboard and a display, which may be for example a PanelView Plus™ 400 graphic terminal as available from Rockwell Automation, Inc., and optionally a payload interface 40. The user interface 38 allows software configuration and control over the AGV 10. The payload interface 40 may monitor and/or control activity relating to the payload, such as detecting the physical presence of the payload, monitoring the temperature and/or actuating a device.

The network interface 36, in turn, is coupled to a radio frequency identification ("RFID") transceiver 42. In operation, the RFID transceiver 42 produces an electromagnetic field via electromagnetic coil 43 for energizing an RFID tag 44 in proximity to the RFID transceiver 42 on the AGV 10. The RFID transceiver may then read from and/or write to one or more of the memory locations in the RFID tag 44. In an alternative embodiment, an RFID antenna which may include a microprocessor may be used instead on the AGV 10 to produce an electromagnetic field for energizing the RFID tag 44 in proximity, for reading/writing the RFID tag 44, and for processing related information, which may be transmitted back to the network interface 36, such as via an RS-485 interface.

A plurality of RFID tags 44 may be placed in the field, warehouse, factory or industrial environment in two dimensional locations, such as dispersed throughout a single floor, or in three dimensional locations, such as dispersed throughout a plurality of floors in a building. The RFID tags 44 may be located any distance from one another depending on a variety of factors including the speed of the AGV 10, the layout of the field, warehouse, factory or industrial environment, the strength of the RFID system and the nature of the work performed. In an alternative embodiment, a plurality of RFID transceivers may be provided on the AGV 10 for failure redundancy and/or increased simultaneous detection of the same or different RFID tags 44, thereby providing further enhanced safety.

The PLC 30 also couples to a wireless network interface 48, which may be, for example, an IEEE 802.11 Ethernet interface, for wirelessly transmitting and receiving information via one or more antennas 50. The PLC 30 communicates, via the wireless network interface 48 and the one or more antennas 50, with a fixed computer or PLC 52 located at a centralized location in the field, warehouse, factory or industrial environment. The fixed PLC 52 also couples to a wireless network interface 54 for wirelessly transmitting and receiving information via one or more antennas 56. The fixed PLC 52 may also be coupled to locally connected terminal 58 having a keyboard, mouse and display, and/or to a network switch, router, gateway and/or secure firewall 60 for connecting the radio frequency identification system 20 to the Internet 62. Through the fixed PLC 52, each AGV in the radio frequency identification system 20 may be monitored and/or controlled.

Figure 3:
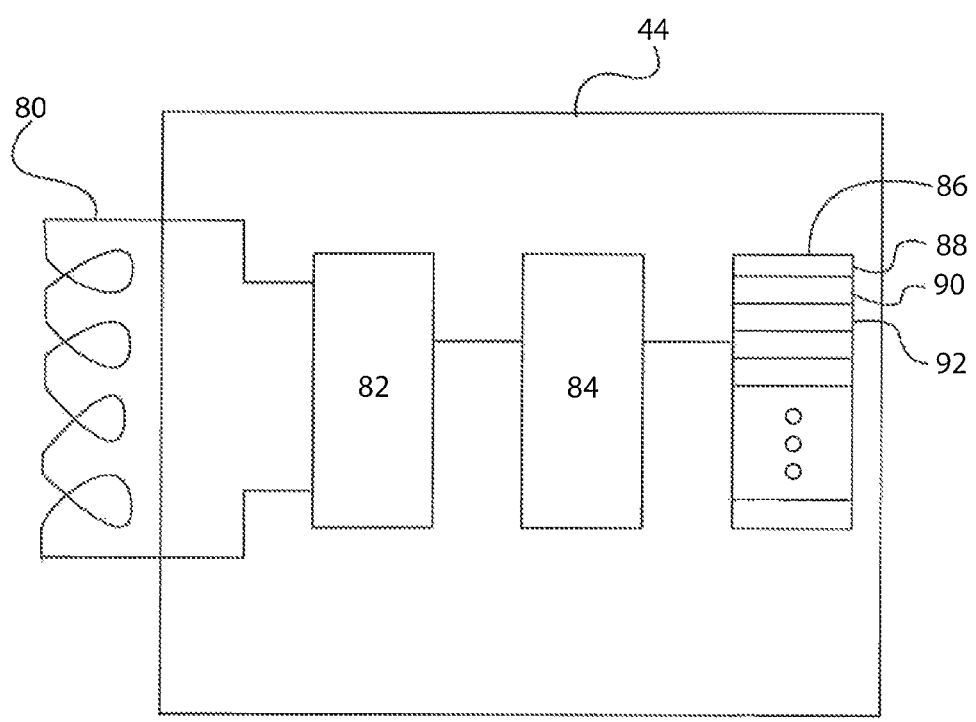
FIG. 3 is an architectural diagram of a radio frequency identification tag in accordance with an embodiment of the present invention.

Referring now to FIG. 3, an architectural diagram of the RFID tag 44 in accordance with an embodiment of the present invention is shown. The RFID tag 44 may comprise and electromagnetic coil 80 coupled to an analog front-end circuit 82. The analog front-end circuit 82, in turn, couples to an RFID tag controller and logic 84, which, in turn, couples to an RFID tag memory 86 comprising a plurality of memory locations. The RFID tag memory 86 may be part of a single memory structure, such as an electrically erasable programmable read only memory ("EEPROM"), or may be part of a plurality of memory structures, such as an EEPROM and another type of non-volatile memory. When energized by the electromagnetic field produced by the RFID transceiver 42 in proximity, the RFID tag 44 energizes and transmits via radio frequency waves data held in the RFID tag's 44 memory. Such transmission may occur according to ISO standards and may occur in half-duplex ("HDX") or full-duplex ("FDX") as understood in the art.

Among the plurality of memory locations in the RFID tag memory 86, a first memory location 88 contains a unique identification that is programmed during manufacturing. In an alternative embodiment, a unique identification may instead be programmed into an alterable memory location, and, optionally, may subsequently be made unalterable.

Remaining memory locations, such as a second and a third memory location 90 and 92, respectively, may contain alterable information for use in subsequent applications. For example, the second memory location 90 may contain a position for the RFID tag 44 in the field, warehouse, factory or industrial environment, such as an address or coordinates, and the third memory location 92 may contain an instruction for the AGV 10, such as to change direction or to stop when coming in proximity to the programmed RFID tag. Each of the alterable memory locations, such as memory locations 90 and 92, may be written and/or re-written by the RFID transceiver 42 or any other RFID transceiver, such as a handheld RFID transceiver, until the alterable memory location is made unalterable, or locked. This may be accomplished, for example, by setting a lock bit associated with a particular memory location to "1."

Referring now to FIGS. 2 and 3 together, in operation, in one embodiment, an RFID system 20 for safely controlling an AGV 10 is provided. The RFID system 20 may comprise a plurality of RFID tags 44, each storing a unique identification in a first memory location 88 and a position in a second memory location 92. The AGV 10 has an RFID transceiver 42 for communicating with each of the plurality of RFID tags 44 and a PLC 30 with a non-transitory computer-readable storage medium 32 containing a predetermined table comprising a plurality of first and second data elements, each of the first and second data elements associated with a particular RFID tag 44. The AGV 10 safely determines its location upon successfully matching the first and second memory locations with a first and second data element, and the AGV 10 triggers a fault upon failing to match the first and second memory locations with a first and second data element.

Figure 4:
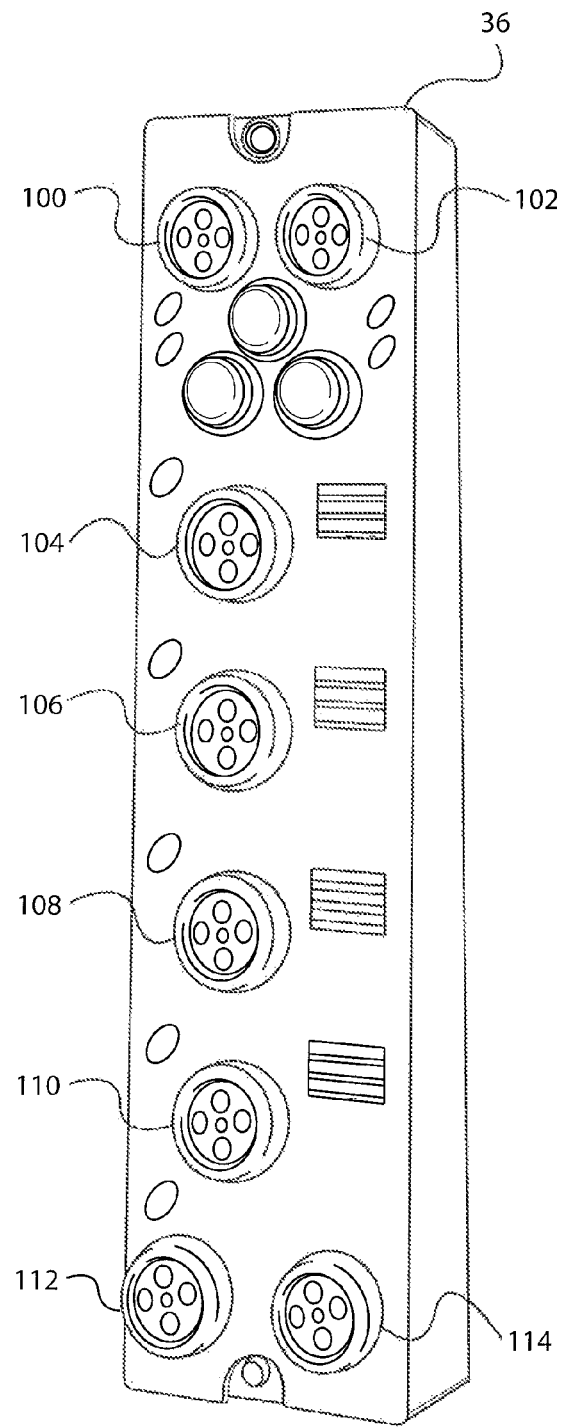
FIG. 4 is an isometric drawing of a network interface on an auto guided vehicle, an automated robot, or other moving object or machine in accordance with an embodiment of the present invention.

Referring now to FIG. 4, an isometric drawing of a network interface 36 that may be used on an AGV 10 in accordance with an embodiment of the present invention is shown. The network interface 36 may include network interfaces 100 and 102, which may provide ControlNet, DeviceNet, EtherNet/IP or Sercos interfaces, for example, whose specifications are published and whose protocols are used broadly by a number of manufacturers and suppliers. The network interface 36 may also include RFID transceiver interfaces 104 and 106, which may provide a serial data interface, such as RS-485. The network interface 36 may also include general purpose I/O interfaces 108 and 110, a power supply interface 112 for receiving power, and a power supply pass through interface 114 for providing power for other devices.

Figure 5:
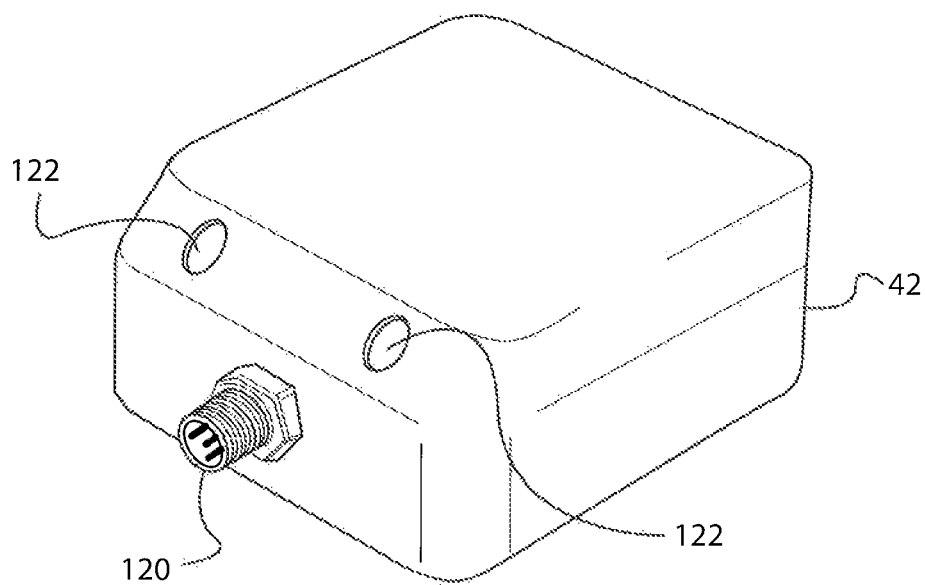
FIG. 5 is an isometric drawing of a radio frequency identification transceiver on an auto guided vehicle, an automated robot, or other moving object or machine in accordance with an embodiment of the present invention.

Referring now to FIG. 5, an isometric drawing of an RFID transceiver 42 that may be used on an AGV 10 in accordance with an embodiment of the present invention is shown. The RFID transceiver 42 may be generally square in appearance with varying heights, and may include an RFID transceiver serial interface 120, which may provide a serial data interface, such as RS-485, to the network interface 36. The electromagnetic coil (not shown) is internal to the RFID transceiver 42. The RFID transceiver 42 may also comprise one or more light emitting diodes ("LED's") 122 for indicating power and/or other diagnostic information.

Figure 6:
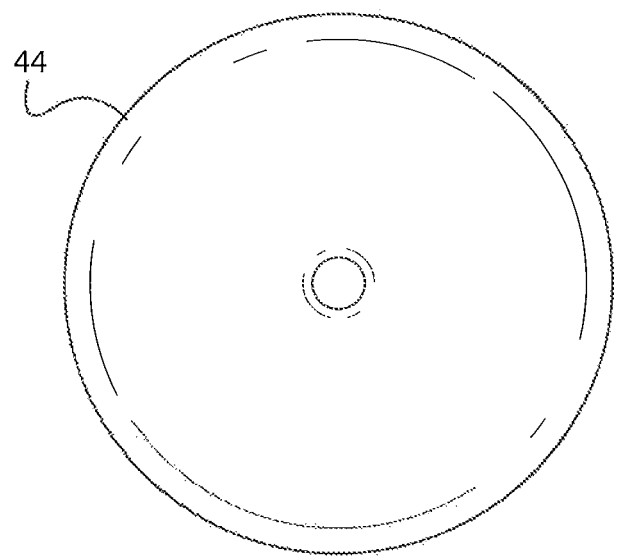
FIG. 6 is an isometric drawing of a radio frequency identification tag in accordance with an embodiment of the present invention.

Referring now to FIG. 6, an isometric drawing of an RFID tag 44 in accordance with an embodiment of the present invention is shown. The RFID tag 44 may be manufactured in practically any shape, such as round as shown, and may be substantially flat and robust to allow adherence to the floor and/or any other surface in the field, warehouse, factory or industrial environment. The electromagnetic coil (not shown) is internal to the RFID tag 44, and the RFID tag 44 may be an inch in diameter or substantially smaller depending on the desired strength of the RFID system as understood in the art.

Figures 7A, 7B:
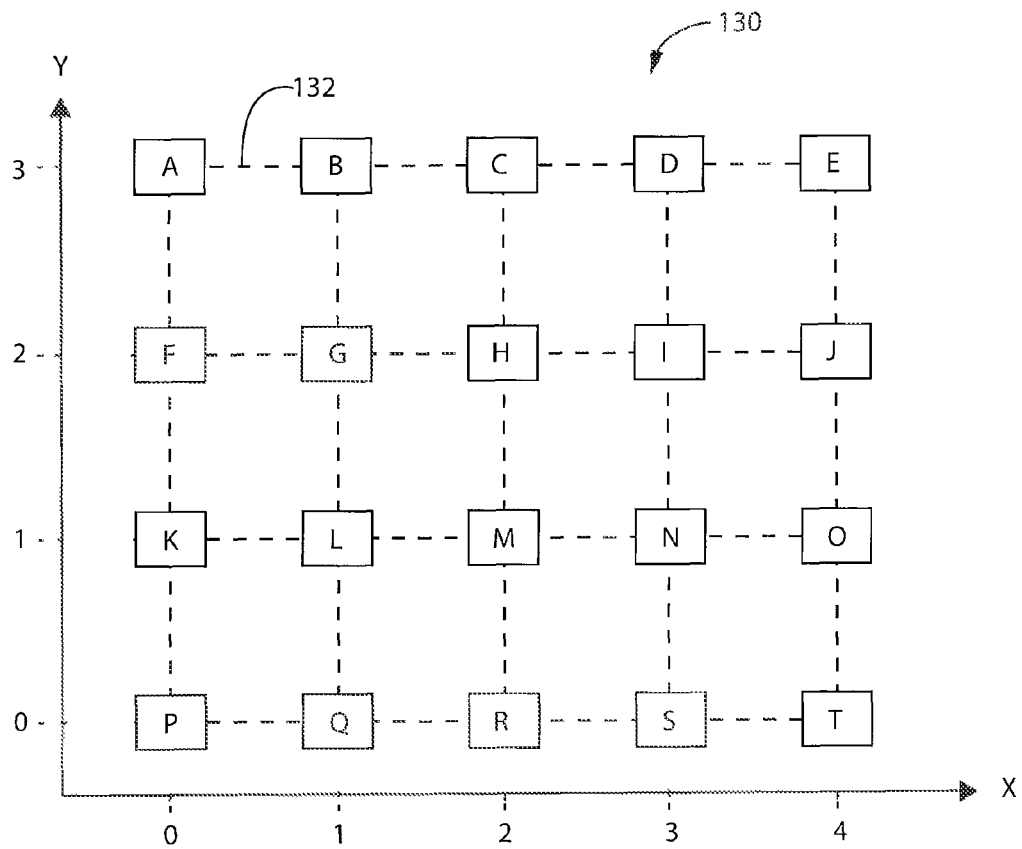
FIG. 7A is a diagram showing the positions of a plurality of radio frequency identification tags in a grid in accordance with an embodiment of the present invention.
FIG. 7B is a table containing data elements associated with the plurality of radio frequency identification tags in FIG. 7A in accordance with an embodiment of the present invention.

By way of example, referring now to FIG. 7A, a diagram showing positions for a plurality of RFID tags 130 arranged in a rectangular grid pattern in accordance with an embodiment of the present invention is shown. The plurality of RFID tags 130 are arranged in four evenly spaced rows, with five RFID tags in evenly spaced columns within each row, representing, for example, the two dimensional locations of RFID tags dispersed throughout a field, warehouse, factory or industrial environment. Pathways 132 connecting each RFID tag to each neighboring RFID tag indicate possible paths in which the AGV may travel. Each RFID tag among the plurality of RFID tags 130 is identified by a unique identifier, such as "A," "B," "C" and so forth, for simplicity. The unique identifier may be stored in the unalterable memory in each corresponding RFID tag to indicate identification, which may be in a first memory location.

The position of each RFID tag may also be tracked via a Cartesian coordinate system comprising x and y axes at a 90° angle (e.g., "x, y"). For example, the position for the RFID tags in the top row in which y=3, in other words, RFID tags "A, B, C, D and E," are "0, 3; 1, 3; 2, 3; 3, 3; and 4, 3," respectively. Similarly, the coordinates for the RFID tags in the next row below in which y=2, in other words, RFID tags "F, G, H, I and J," are "0, 2; 1, 2; 2, 2; 3, 2; and 4, 2," respectively. The coordinates for each RFID tag may be stored in the alterable memory in each corresponding RFID tag to indicate position, which may be in a second memory location. In this way, each RFID tag may contain both a unique identification and a unique position.

In the present embodiment, a position stored in alterable memory in the RFID tag may be left unlocked so that it can be rewritten, thereby flexibly allowing re-positioning of the RFID tag in the field, warehouse, factory or industrial environment. However, alternatively, a position stored in the alterable memory in the RFID tag may be locked so that it cannot be rewritten, thereby increasing security. Some RFID systems may advantageously mix unlocked and locked RFID tags in the same RFID system depending on applications.

In yet another embodiment, additional information may be stored in each RFID tag, which may be left unlocked or locked, such as an instruction for the AGV to change direction or to stop when coming in proximity to the RFID tag, or the date and time of placement of the RFID tag.

Referring now to FIG. 7B, a table 140 containing data elements associated with the plurality of RFID tags in FIG. 7A is shown. The table 140 may be a predetermined table stored in a non-transitory computer-readable storage medium in the AGV. The table 140 may comprise a plurality of rows and columns in which each row corresponds to an RFID tag in the RFID system and each column corresponds to a data element for that particular RFID tag. For example, the first row corresponding to the first RFID tag in the RFID system may have a first data element "A" in the first column and a second data element "0, 3" in the second column. The second row corresponding to the second RFID tag in the RFID system may have a first data element "B" in the first column and a second data element "1, 3" in the second column, and so forth.

In operation, an AGV may begin by reading a first and second memory location from a radio frequency identification tag in proximity, such as RFID tag "A" with the first memory location being the unique identification "A" and the second memory location being the position "0, 3." The AGV may then compare the first and second memory locations with a plurality of first and second data elements stored in the predetermined table 140. The AGV may then safely determine its location upon successfully matching the first and second memory locations with the first and second data elements in the first row of the table 140. The AGV may then move to the next RFID tag according to its program, which may be, for example, RFID tag "B." Alternatively, the AGV may be programmed to receive its next direction from the currently read RFID tag "A," which may instruct the AGV to instead move to RFID tag "F."

If, however, the AGV fails to match the first and second memory locations with a first and second data element in the table 140, the AGV may trigger a fault and corrective action may be taken. Corrective actions for the AGV may include slowing down, stopping, changing direction and/or awaiting a technician. Triggering a fault may include sending alerts via light, sound, electronic or electromagnetic transmission, or otherwise.

In an alternative embodiment, the AGV may also predict the first and second memory locations for the next RFID tag to be read. In addition, the AGV may trigger a fault if the first and second memory locations stored in the next RFID tag that is read do not match what the AGV predicted.

Figure 8:
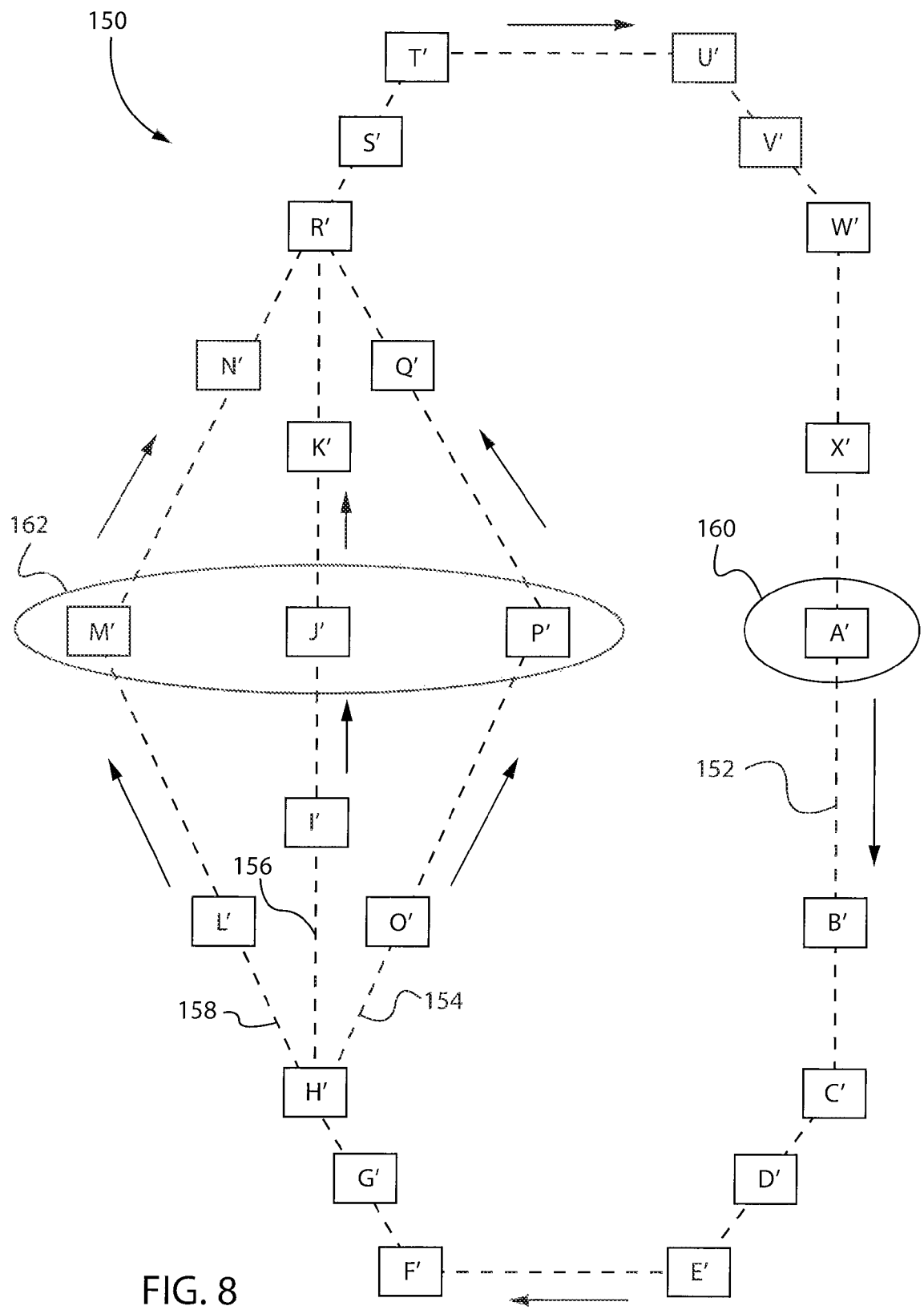
FIG. 8 is a diagram showing alternative positions of a plurality of radio frequency identification tags in one or more pathways in accordance with an embodiment of the present invention.

Referring now to FIG. 8, a diagram showing alternative positions for a plurality of RFID tags 150 in one or more pathways in accordance with an embodiment of the present invention is shown. Unlike the plurality of RFID tags 130 arranged in the rectangular grid pattern in FIG. 7, in which pathways 132 connect each RFID tag to each neighboring RFID tag, the plurality of RFID tags 150 are arranged in only a few, single direction pathways 152, 154, 156 and 158 in FIG. 8.

In operation, an AGV may begin in proximity to RFID tag "A'," which may be positioned in a tool room 160, for example. The AGV may then continue in one direction only to RFID tag "B'" via a first pathway 152, and then to RFID tag "C'" in the same direction. The AGV may then make a turn through RFID tags "D'" and "E'," and then continue in one direction to RFID tag "F'." In making the turn, RFID tags "C'," "D'" and "E'" may be grouped closer together than other RFID tags along a straight away. The AGV may then continue make another turn through RFID tags "G'" and "H'," and at RFID tag "H'," the AGV may be diverted into one of three directions. The AGV may continue along a second pathway 154 to RFID tag "O'," or a third pathway 156 to RFID tag "I'," or a fourth pathway 158 to RFID tag "L'." The second, third and fourth pathways 154, 156 and 158 may lead to different sections of a machine area 162, for example. The AGV may follow either the second, third or fourth pathway 154, 156 and 158 to the machine area 162, which decision may be based on the AGV's own programming or the instructions read from RFID tag "H'." From the machine area 162, the AGV may then rejoin the first pathway 152 again at RFID tag "R'" from any of the second, third or fourth pathway 154, 156 and 158 chosen. From RFID tag "R'," the AGV may then make another turn through RFID tags "S'" and "T'," and then continue in one direction to RFID tag "U'." The AGV may then make another turn through RFID tags "V'" and "W'," and then continue in one direction to RFID tag "X'." and then returning again to RFID tag "A'" in the tool room 160.

Figure 9:
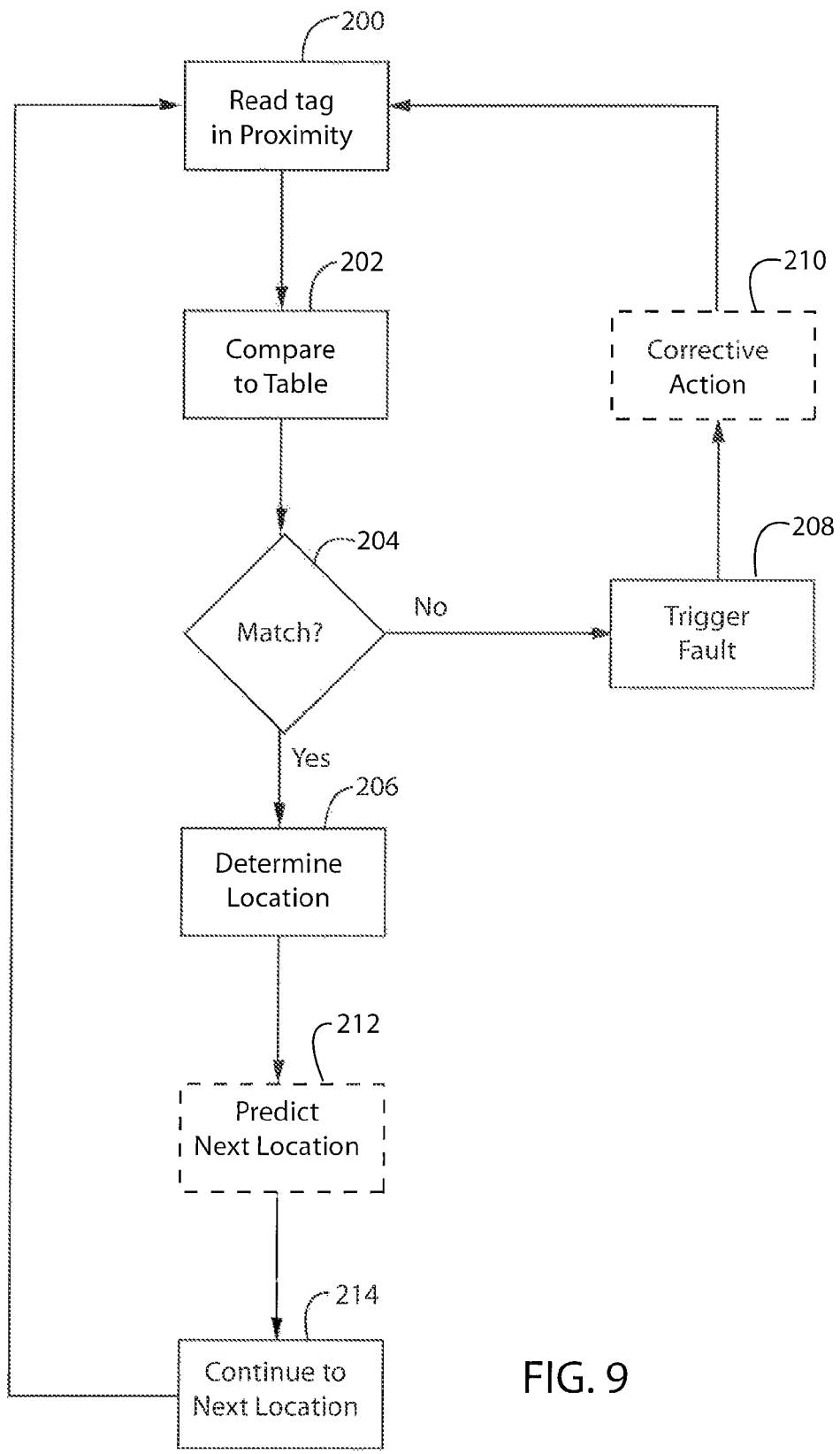
FIG. 9 is a flow chart illustrating the steps for safely controlling an auto guided vehicle, an automated robot, or other moving object or machine using radio frequency identification in accordance with an embodiment of the present invention.

Referring now to FIG. 9, a flow chart illustrating the steps for safely controlling an AGV using RFID in accordance with an embodiment of the present invention is shown. Beginning at step 200, a memory location in an RFID tag in proximity is read, with the memory location storing a unique identification. Next, in step 202, the memory location are compared with a plurality of data elements stored in a predetermined table, with each of the data elements associated with a particular RFID tag. In decision step 204, a match between the memory location and a data element is determined. Upon a successful match, in step 206, the location of the AGV is safely determined. However, upon a failed match, in step 208, a fault is triggered, then, in optional step 210, corrective action may be taken and the cycle may begin again at step 200.

On the other hand, following a successful match in decision step 204 and the safe determination of the location of the AGV in step 206, the AGV may predict the memory location for the next RFID tag in optional step 212. The AGV may then continue to the next location in step 214, and the cycle may begin again at step 200. If the AGV predicted the memory location for the next RFID tag in step 212, decision step 204 may then further include determining a match between the memory location read and the memory location that the AGV predicted.

In an alternative embodiment, step 200 may include reading a plurality of memory locations, including a unique identification, a position and/or an instruction. In step 202, one or more of the plurality of memory locations, such as the unique identification and/or the position, may be compared to a plurality of data elements stored in the predetermined table, and in decision step 204, a match between one or more of the plurality of memory locations and one or more corresponding data elements may be determined. Upon a successful match, in step 206, the location of the AGV may be safely determined. However, upon a failed match, in step 208, a fault may be triggered, then, in optional step 210, corrective action may be taken and the cycle may begin again at step 200. Following a successful match in decision step 204 and the safe determination of the location of the AGV in step 206, the AGV may similarly predict one or more of the plurality memory locations for the next RFID tag in optional step 212, then continue to the next location in step 214, and the cycle may begin again at step 200. If the AGV predicted the one or more of the plurality memory locations for the next RFID tag in step 212, decision step 204 may then further include determining a match between the one or more of the plurality memory locations read and the one or more of the plurality of memory locations that the AGV predicted.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as coming within the scope of the following claims. All of the publications described herein including patents and non-patent publications are hereby incorporated herein by reference in their entireties.

The present invention may be part of a "safety system" used to protect human life and limb in a field, warehouse, factory or industrial environment. Nevertheless, the term "safety," "safely" or "safe" as used herein is not a representation that the present invention will make the environment safe or that other systems will produce unsafe operation. Safety in an industrial process depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

The invention claimed is:

1. An object configured to move, the object including a processor executing a program stored in a non-transitory computer-readable storage medium and having a radio frequency identification transceiver or antenna for communicating with a plurality of radio frequency identification tags, wherein the program instructs the processor to perform the following steps:
   (a) read first and second memory locations from a radio frequency identification tag in proximity, the first memory location storing a unique identification and the second memory location storing a position;
   (b) compare the unique identification stored in the first memory location and the position stored in the second memory location with a plurality of first and second data elements stored in a predetermined table in a non-transitory computer-readable storage medium of the object, each of the first and second data elements associated with a particular radio frequency identification tag;
   (c) determine a current position of the object from the position stored in the radio frequency identification tag upon successfully matching the unique identification stored in the first memory location with a first data element and the position stored in the second memory location with a second data element, wherein the first data element is associated with the second data element in the predetermined table, and after determining the current position, move to a next radio frequency identification tag;
   (d) trigger a fault upon failing to match the unique identification stored in the first memory location with a first data element or the position stored in the second memory location with a second data element;
   (e) predict a unique identification stored in a first memory location and a position stored in a second memory location of a next radio frequency identification tag to be read; and
   (f) trigger a fault if at least one of the first memory location and the second memory location read from the next radio frequency identification tag in proximity fails to match the prediction.

2. The object of claim 1, wherein the object stops upon triggering a fault.

3. The object of claim 1, further comprising reading a third memory location from the radio frequency identification tag in proximity, the third memory location storing an instruction for the object.

4. The object of claim 3, wherein the instruction commands the object to change direction.

5. The object of claim 3, wherein the instruction commands the object to stop.

6. The object of claim 1, wherein the plurality of radio frequency identification tags is arranged in a grid.

7. The object of claim 1, wherein the plurality of radio frequency identification tags is arranged in a single direction pathway.

8. A method for controlling an object configured to move using radio frequency identification comprising:
 (a) reading first and second memory locations from a radio frequency identification tag in proximity, the first memory location storing a unique identification and the second memory location storing a position;
 (b) comparing the unique identification stored in the first memory location and the position stored in the second memory location with a plurality of first and second data elements stored in a predetermined table in a non-transitory computer-readable storage medium of the object, each of the first and second data elements associated with a particular radio frequency identification tag;
 (c) determining a current position of the object from the position stored in the radio frequency identification tag upon successfully matching the unique identification stored in the first memory location with a first data element and the position stored in the second memory location with a second data element, wherein the first data element is associated with the second data element in the predetermined table, and after determining the current position, move to a next radio frequency identification tag;
 (d) triggering a fault upon failing to match the unique identification stored in the first memory location with a first data element or the position stored in the second memory location with a second data element;
 (e) predicting a unique identification stored in a first memory location and a position stored in a second memory location of a next radio frequency identification tag to be read; and
 (f) triggering a fault if at least one of the first memory location and the second memory location read from the next radio frequency identification tag in proximity fails to match the prediction.

9. The method of claim 8, further comprising the object stopping upon triggering a fault.

10. The method of claim 8, further comprising reading a third memory location from the radio frequency identification tag in proximity, the third memory location storing an instruction for the object.

11. A radio frequency identification system for controlling an object configured to move, the system comprising:
 a plurality of radio frequency identification tags, each storing a unique identification in a first memory location and a position in a second memory location;
 a fixed computer at a centralized location; and
 an object configured to move, the object in wireless communication with the fixed computer, the moving object having a radio frequency identification transceiver or antenna for communicating with each of the plurality of radio frequency identification tags and a processor with a non-transitory computer-readable storage medium containing a predetermined table comprising a plurality of first and second data elements, each of the first and second data elements associated with a particular radio frequency identification tag,
 wherein the object is operable to:
 (a) read first and second memory locations from a radio frequency identification tag in proximity;
 (b) compare the unique identification stored in the first memory location and the position stored in the second memory location with the plurality of first and second data elements stored in the predetermined table in the non-transitory computer-readable storage medium of the object, each of the first and second data elements associated with a particular radio frequency identification tag;
 (c) determine a current position of the object from the position stored in the radio frequency identification tag upon successfully matching the unique identification stored in the first memory location with a first data element and the position stored in the second memory location with a second data element, wherein the first data element is associated with the second data element in the predetermined table, and after determining the current position, move to a next radio frequency identification tag;
 (c) trigger a fault upon failing to match the unique identification stored in the first memory location with a first data element or the position stored in the second memory location with a second data element;
 (d) predict a unique identification stored in a first memory location and a position stored in a second memory location of a next radio frequency identification tag to be read; and
 trigger a fault if at least one of the first memory location and the second memory location read from the next radio frequency identification tag in proximity fails to match the prediction.

12. The object of claim 1, wherein the object is an auto guided vehicle (AGV) with wheels, and further comprising the AGV being configured to transport a payload.

13. The radio frequency identification system of claim 11, wherein the object is operable to read a third memory location from the radio frequency identification tag in proximity, the third memory location storing an instruction for the object.

14. The radio frequency identification system of claim 11, wherein the fixed computer is a programmable logic controller (PLC) in communication with a plurality of objects.

15. The radio frequency identification system of claim 11, wherein the fixed computer is operable to command the object to stop.

16. The radio frequency identification system of claim 11, wherein the object stops upon triggering a fault.

* * * * *